US011193541B1

(12) United States Patent
Hassell

(10) Patent No.: US 11,193,541 B1
(45) Date of Patent: Dec. 7, 2021

(54) SELF-LUBRICATING SLZ-TYPE TOW DOLLY ASSEMBLY

(71) Applicant: Curtis Collins Hassell, Medford, OR (US)

(72) Inventor: Curtis Collins Hassell, Medford, OR (US)

( * ) Notice: Subject to any disclaimer, the term of this patent is extended or adjusted under 35 U.S.C. 154(b) by 0 days.

(21) Appl. No.: 16/941,902

(22) Filed: Jul. 29, 2020

Related U.S. Application Data

(60) Provisional application No. 63/037,762, filed on Jun. 11, 2020.

(51) Int. Cl.
| | |
|---|---|
| *F16C 17/10* | (2006.01) |
| *F16C 27/06* | (2006.01) |
| *F16C 33/10* | (2006.01) |
| *F16C 33/66* | (2006.01) |
| *B62B 5/00* | (2006.01) |

(52) U.S. Cl.
CPC ............ *F16C 33/66* (2013.01); *B62B 5/0083* (2013.01); *F16C 17/10* (2013.01); *F16C 27/063* (2013.01); *F16C 33/102* (2013.01); *F16C 33/1045* (2013.01); *B62B 2202/90* (2013.01)

(58) Field of Classification Search
CPC ...... F16C 17/10; F16C 27/063; F16C 33/102; F16C 33/1045; F16C 33/66; B62B 5/0083; B62B 2202/90; H02K 5/167
USPC ........ 384/129, 276, 282, 396, 416; 280/462, 280/476.1, 402; 414/428, 435
See application file for complete search history.

(56) References Cited

U.S. PATENT DOCUMENTS

| 2,350,624 | A | * | 6/1944 | McDaniel | B62D 53/0864 |
| | | | | | 280/476.1 |
| 2,738,240 | A | * | 3/1956 | Parsons | F16C 27/063 |
| | | | | | 384/202 |
| RE27,998 | E | * | 4/1974 | Abel | F16C 33/103 |
| | | | | | 384/411 |
| 4,127,310 | A | * | 11/1978 | Werner | F16C 33/08 |
| | | | | | 277/500 |
| 4,664,399 | A | * | 5/1987 | Mobley | B66F 15/00 |
| | | | | | 280/43.17 |
| 4,846,484 | A | * | 7/1989 | Nekola | B66F 5/02 |
| | | | | | 280/43.11 |

(Continued)

*Primary Examiner* — Marcus Charles
(74) *Attorney, Agent, or Firm* — Jerry Haynes Law

(57) ABSTRACT

A self-lubricating SLZ-type tow dolly assembly provides a self-lubricating bearing sleeve operable in an SLZ-type tow dolly. This serves to negate the need for grease fittings and manually greasing of the spindle bushing. The self-lubricating bearing sleeve press fit into a spindle bushing disposed in a spindle assembly to lubricate the spindle bolt. This facilitates rotational motion against the spindle bolt. In one embodiment, the self-lubricating bearing sleeve is a self-lubricating Igus M250 bearing sleeve that press fits into dolly pivot bushings. Rotational and linear motion creates pressure that discharges incremental amounts of the lubricant. Thus, self-lubricating bearing sleeve serves as a self-lubricating, pivot-point bearing sleeve. The self-lubricating bearing sleeve may be a plastic component with a lubricant integral therein. This allows for self-lubricating of bushing and spindle components during rotation of spindle assembly. In alternative embodiments, a trip assembly and a spindle assembly operate in the self-lubricating bearing sleeve.

20 Claims, 8 Drawing Sheets

(56) References Cited

U.S. PATENT DOCUMENTS

| | | | | |
|---|---|---|---|---|
| 5,941,675 | A * | 8/1999 | Orr | B66F 5/02 |
| | | | | 414/428 |
| 7,275,753 | B1 * | 10/2007 | Ceccarelli | B60P 3/127 |
| | | | | 280/43.21 |
| 7,673,887 | B2 * | 3/2010 | Hassell | B62B 5/0083 |
| | | | | 280/43.21 |
| 8,523,217 | B2 | 9/2013 | Anderson | |
| 8,657,305 | B1 * | 2/2014 | Hassell | B60P 3/127 |
| | | | | 280/43.21 |
| 9,744,955 | B1 * | 8/2017 | Hoeper | B60T 11/04 |
| 10,829,096 | B2 * | 11/2020 | Keller | B60T 11/08 |
| 2003/0057622 | A1 * | 3/2003 | Bovio | B60G 11/003 |
| | | | | 267/281 |
| 2014/0162850 | A1 * | 6/2014 | Chen | A63B 21/0724 |
| | | | | 482/104 |
| 2017/0217266 | A1 | 8/2017 | Anderson et al. | |

* cited by examiner

SELF-LUBRICATING SLZ-TYPE TOW DOLLY ASSEMBLY

CROSS-REFERENCE TO RELATED APPLICATIONS

This application claims the benefits of U.S. provisional application No. 63/037,762, filed Jun. 11, 2020 and entitled SLZ TOW DOLLY WITH SELF-LUBRICATING BEARING SLEEVE, which provisional application is incorporated by reference herein in its entirety.

FIELD OF THE INVENTION

The present invention relates generally to a self-lubricating tow dolly assembly. More so, the present invention relates to a self-lubricating SLZ-type tow dolly that eliminates the need for grease fittings in the dolly pivot bushing. And thereby the need to manually grease the dolly pivot bushing through use of a self-lubricating Igus M250 bearing sleeve that is installed in the dolly pivot bushings and spindle subassembly. Thus, a unique, self-lubricating, pivot-point bearing sleeve for the self-lubricating SLZ-type tow dolly is created.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, a tow dolly is a portable trailer that can be assembled and disassembled, and designed to tow an automobile by carrying the front or rear wheels of the automobile while the other wheels are lifted up by a tow truck. Often, tow dollies utilize a pair of axles that are located between the wheels of the tow dolly. The axles are spaced apart so as to cradle the front or rear wheels of a vehicle to be towed. The axles are supported by a pair of elongated support tubes, which rotatably carry wheels. In operation, the front wheels or rear wheels ride on the dolly while the front or rear wheels ride on the back of the tow truck.

In general, bearing systems include grease fittings in which to introduce the lubricant by the pressure of either a manual or pneumatic grease gun. This is periodically accomplished so as to keep them lubricated, which will prevent the components from drying out. There is also the consideration of moisture build up causing the components to rust and seize up. It is also known in the art that, over time, components wear out and require replacement. This leads to additional expense in buying new components.

It is known in the art that an "SLX" tow dolly utilizes a spindle subassembly supported on a support tube. Those skilled in the art would recognize that the designation "SL" generally refers to a "self-loading" dolly. Also, a pair of length adjustable axles supports the vehicle wheels. The SLX tow dolly also utilizes a grease fitting, however, to lubricate the spindle bolt and the spindle bushing. As with other tow dollies, i.e., SL tow dolly, the SLX tow dolly requires the manual injection of a lubricant through a grease fitting. The grease fitting is in fluid communication with the spindle bolt and bushing components. This is necessary for efficient operation of the spindle subassembly.

Other proposals have involved tow dolly assemblies. The problem with these towing assemblies is that they require manual lubrication of the dolly pivot bushing through the grease fittings. Even though the above cited tow dolly assemblies meet some of the needs of the market, a self-lubricating SLZ-type tow dolly that negates the use of grease fittings in the dolly pivot bushing, and thereby, the need to manually grease the dolly pivot bushing through use of a self-lubricating Igus M250 bearing sleeve that is installed in each of the dolly pivot bushings, which creates a unique, self-lubricating, pivot-point bearing sleeve for the self-lubricating SLZ-type tow dolly, is still desired.

SUMMARY

Illustrative embodiments of the disclosure are generally directed to a self-lubricating SLZ-type tow dolly assembly, as is commonly used for towing an automobile by carrying the front or rear wheels of the automobile while the other wheels are lifted up by a tow truck. The self-lubricating SLZ-type tow dolly assembly, and specifically the bearing sleeve thereof, is uniquely configured to eliminate the need for grease fittings, and the requirement of manually greasing the dolly pivot bushing. This is possible because the assembly utilizes a self-lubricating bearing sleeve, such as an Igus M250 bearing sleeve, that is installed in the dolly pivot bushings and spindle subassembly. The self-lubricating pivot-point bearing sleeve works with the spindle assembly to eliminate the need for grease or lubrication.

In some embodiments, the self-lubricating SLZ tow dolly assembly with self-lubricating bearing sleeve replaces the SLX tow dolly by eliminating the grease fittings and the need to manually grease the dolly pivot bushing. This elimination of manual lubrication is possible through use of a self-lubricating bearing sleeve that is fitted into a dolly pivot bushing, so as to lubricate the bolt. This serves to facilitate rotational motion of the spindle subassembly inside the spindle bushing.

In another embodiment, the self-lubricating bearing sleeve is press fit into a dolly pivot bushing. The self-lubricating bearing sleeve is configured to help dampen vibrations and facilitate rotational and linear motion in the spindle subassembly that supports the dolly wheels. During operation of the tow dolly, rotational and linear motion creates pressure that discharges incremental amounts of the lubricant. Through this incremental lubricant discharge mechanism, the self-lubricating bearing sleeve serves as a self-lubricating, pivot-point bearing sleeve—requiring no manual lubricating efforts.

In one possible embodiment, the self-lubricating SLZ tow dolly assembly comprises a pair of elongated support tubes that are disposed in a spaced-apart relationship. The support tubes are configured with two or more boreholes near the termini. The assembly can also include a pair of axles extended disposed in a spaced-apart relationship, and extended perpendicularly between the support tubes. The axles are disposed at a distance operable to enable carrying the front wheels or rear wheels of a vehicle.

In addition, the assembly comprises two or more dolly wheels that are joined with the support tubes, and in approximate alignment with the boreholes in the support tubes. The dolly wheels comprise one or more central hub holes and a perimeter tread. Further, the dolly wheels enable mobility of the SLZ tow dolly. The assembly also provides a spindle subassembly. The spindle subassembly comprises a shaft and front and rear brackets. The shaft is sized to rotatably carry the dolly wheels. The front and rear brackets are defined by one or more fastening holes for fastening the spindle subassembly to the tow dolly assembly.

Continuing, the spindle subassembly also provides a spindle bolt having a closed end and an open end. The spindle bolt is configured to pivotally fasten the spindle subassembly to the support tubes. The spindle bolt passes through the spindle bushing which is fixed in the boreholes of the support tubes and the fastening holes of the bracket for the spindle subassembly.

The assembly also includes a self-lubricating bearing sleeve that concentrically houses the spindle bolt. The self-lubricating bearing sleeve is configured to facilitate rotational motion against the spindle bolt with the lubricant. The lubricant is integral in the self-lubricating bearing sleeve.

Additionally, the assembly comprises a spindle bushing that concentrically houses the self-lubricating bearing sleeve, whereby the sleeve is integral in dampening vibrations between the spindle bolt and the spindle bushing. In this manner, the lubricant from the self-lubricating bearing sleeve helps lubricate the spindle bolt.

Furthermore, the assembly provides a spindle screw that is fastenable to the open end of the spindle bolt. The spindle screw is configured to fasten the spindle bolt in the bushing which is fixed in the boreholes formed in the support tubes. Further, the assembly provides a wheel strap configured to secure the dolly wheels between the pair of axles.

In another aspect, the self-lubricating bearing sleeve is a self-lubricating Igus M250 bearing sleeve.

In another aspect, the self-lubricating bearing sleeve is fabricated from plastic.

One objective of the present invention is to eliminate the need to manually lubricate a spindle bolt in a tow dolly.

Another objective is to enhance tow dolly rotary operations that require low friction coefficient, high durability, high load capacity, high heat resistance, and high oil resistance.

Another objective is to eliminate seized components from corrosion.

Yet another objective is to reduce maintenance on a tow dolly.

Yet another objective is to provide greaseless bearing sleeves that create a better fit in the spindle bushing.

Yet another objective is to provide greaseless bearing sleeves that are: self-lubricating and maintenance-free; excellent vibration damping; resistant to edge loads; high impact resistance; thick walled according to DIN 1850.

Yet another objective is to provide bearing and spindle components that do not wear out.

Yet another objective is to achieve fewer components, which leads to less manufacturing, which leads to more cost-effective production.

Yet another objective is to provide an inexpensive method to manufacture bushing for a tow dolly.

Yet another objective is to eliminate the mechanical skill set and tools necessary to lubricate an SLZ-tow dolly.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

A self-lubricating SLZ-type tow dolly assembly, and a prior art SLX tow dolly are referenced in FIGS. 1-13. The self-lubricating SLZ-type tow dolly assembly, hereafter "assembly" provides a self-lubricating bearing sleeve 200. Such self-lubrication is useful for rotary operations of a tow dolly that require low friction coefficient, high durability, high load capacity, high heat resistance, and high oil resistance. Thus, by eliminating the need for manual introduction of lubricants into the dolly pivot bushing, the assembly 100 does not need to install grease fittings in the dolly pivot bushing.

Figure 1:
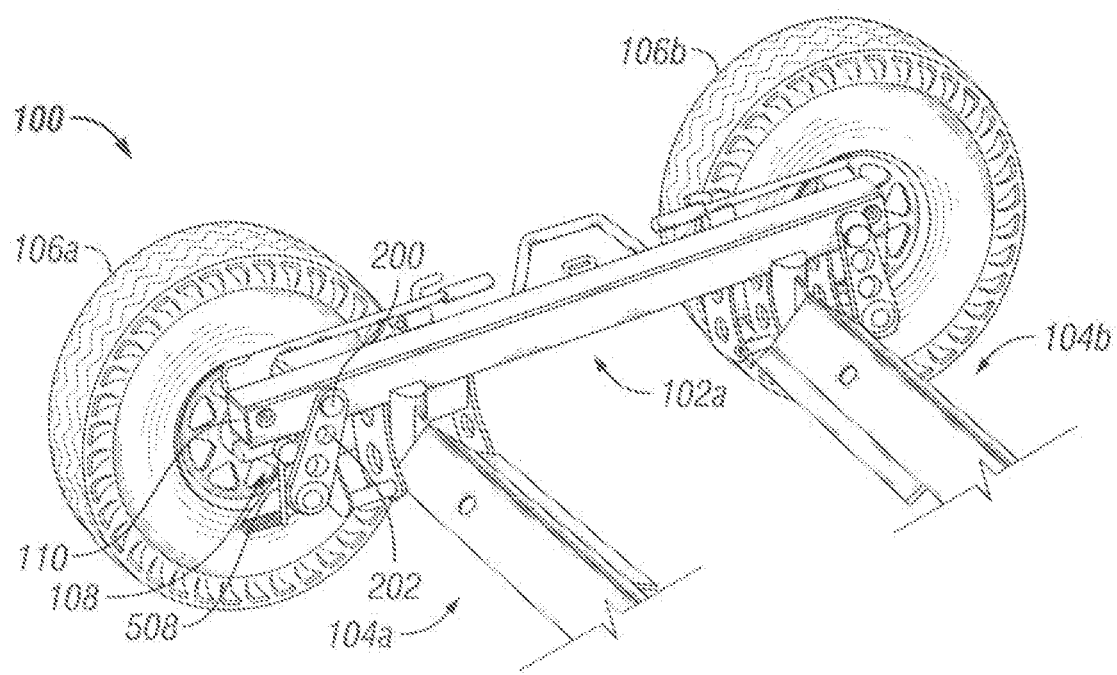
FIG. 1 illustrates a perspective view of an exemplary self-lubricating SLZ-type tow dolly assembly, in accordance with an embodiment of the present invention.

As referenced in FIG. 1, the self-lubricating bearing sleeve 200 is installed in the dolly pivot bushings and spindle subassembly, which creates a unique, self-lubricating, pivot-point bearing sleeve 200 for the self-lubricating SLZ-type tow dolly. In one non-limiting embodiment, the self-lubricating bearing sleeve 200 is a self-lubricating Igus M250 bearing sleeve. The assembly 100 is, however, scalable and adaptable to different types of tow dollies; and thus, similar self-lubricating bearing sleeves may also be used.

It is significant to note that the prior art SLX tow dolly 300, and the presently disclosed SLZ tow dolly assembly 100 have multiple moving parts that require lubrication to eliminate friction and prevent premature wear on components. Many bearing systems employ the use of grease fittings in which to introduce the lubricant by the pressure of either a manual or pneumatic grease gun. This is periodically accomplished so as to keep them lubricated, which will prevent the components from drying out. There is also the consideration of moisture build up causing the components to rust and seize up. It is also known in the art that, over time, components wear out and require replacement. This leads to additional expense in buying new components.

Figure 3:
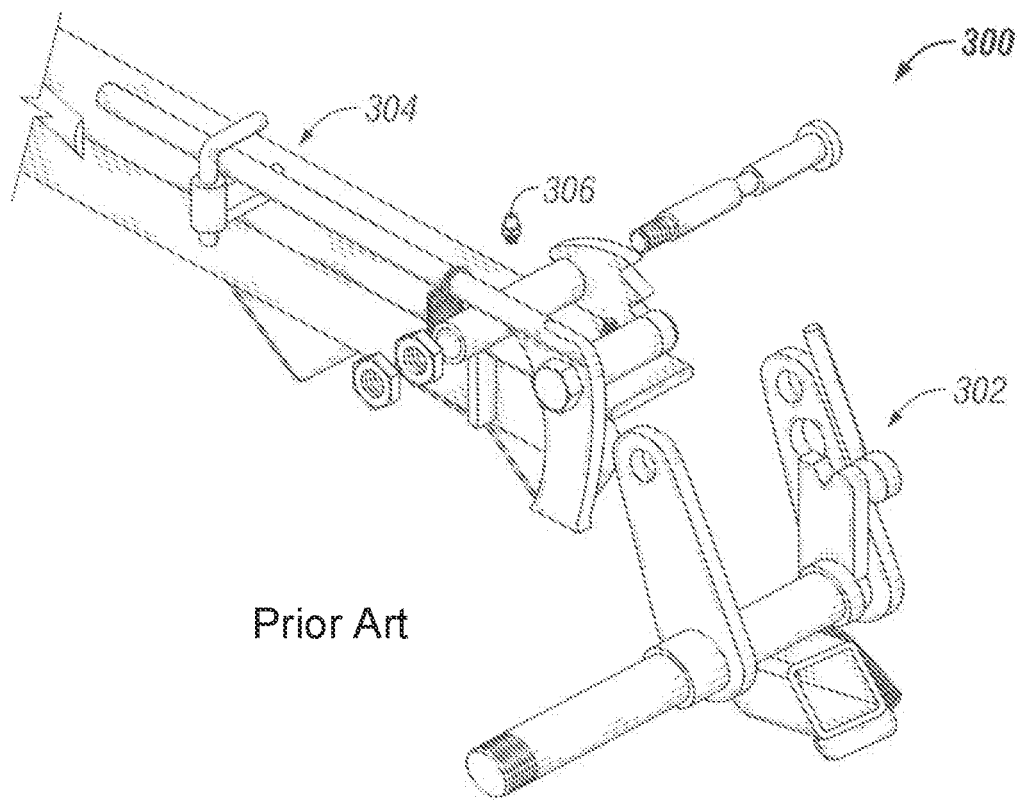
FIG. 3 illustrates an isometric side view of an exemplary prior art SLX tow dolly, in accordance with an embodiment of the present invention.
Figure 4:
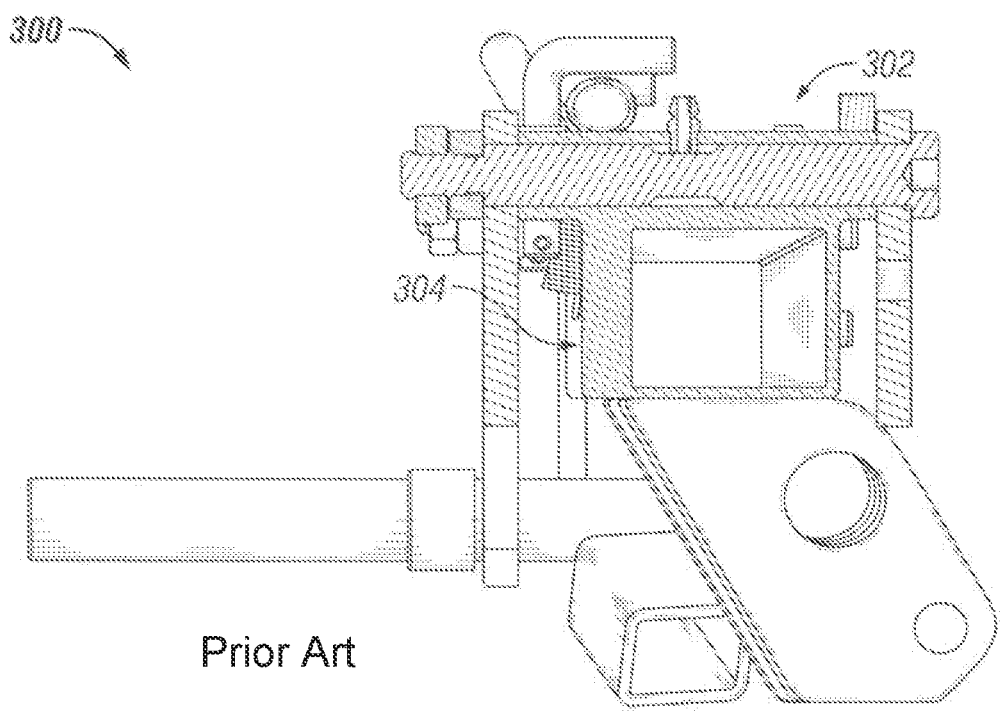
FIG. 4 illustrates a sectioned view of the SLX tow dolly shown in FIG. 3, in accordance with an embodiment of the present invention.

A prior art SLX tow dolly 300, shown in FIG. 3. As illustrated, the SLX tow dolly 300 is substantially the same as the SLZ tow dolly assembly 100. The SLX tow dolly 300 utilizes a spindle subassembly 302 supported on a support tube 304. Also, as FIG. 4 shows, a pair of length adjustable axles supports the vehicle wheels. The SLX tow dolly 300 also utilizes a grease fitting 306, however, to lubricate the spindle bolt 500 and the spindle bushing 506. As with other prior art tow dollies, i.e., SL tow dolly, the SLX tow dolly 300 requires the manual injection of a lubricant through a grease fitting. The grease fitting 306 is in fluid communication with the spindle bolt and bushing components. This is necessary for efficient operation of the spindle subassembly 108.

In regards to the present invention, the assembly 100 eliminates these lubrication issues from occurring. As FIG. 2 references, this is accomplished through the use of a greaseless bearing sleeve 200 that perpetually lubricates, for the life of the components, eliminating the need to monitor a lubrication schedule. Consequently, spindle bolt and bushing components do not wear out, nor do the components seize up from rust. Eventually, when the greaseless bearing sleeve 200 does wear out, it is far less expensive to replace it than the dolly components.

Figure 5:
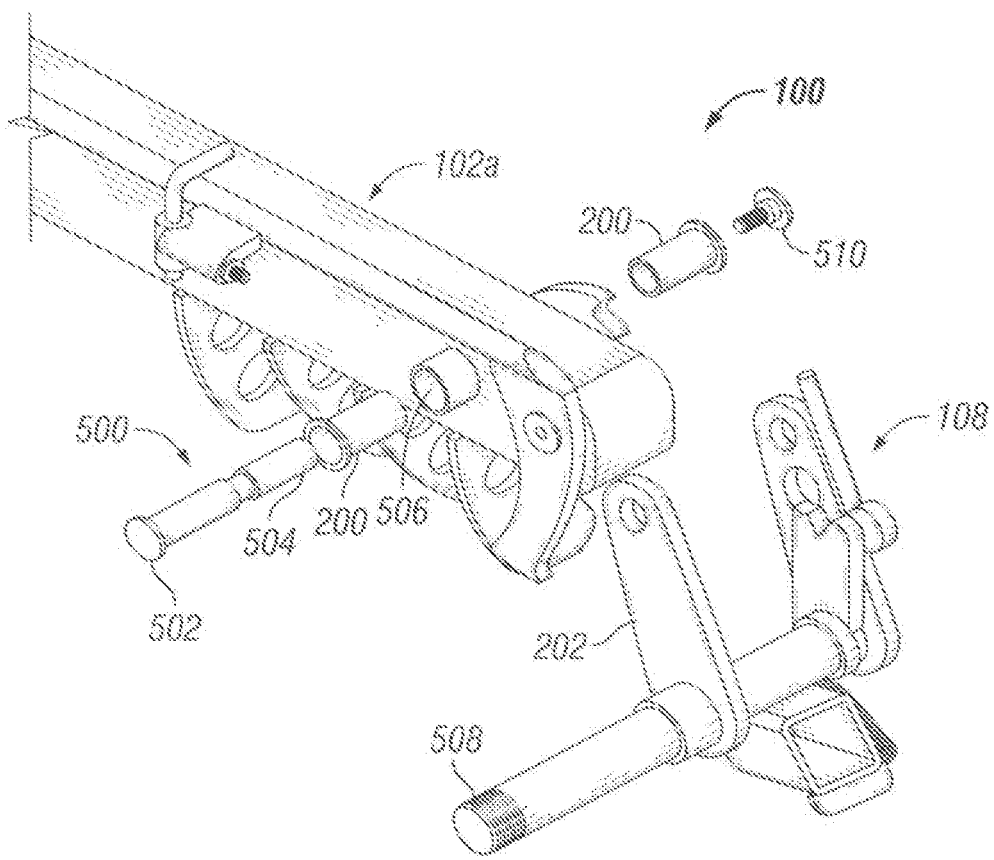
FIG. 5 illustrates an isometric side view of the self-lubricating SLZ-type tow dolly assembly, in accordance with an embodiment of the present invention.
Figure 6:
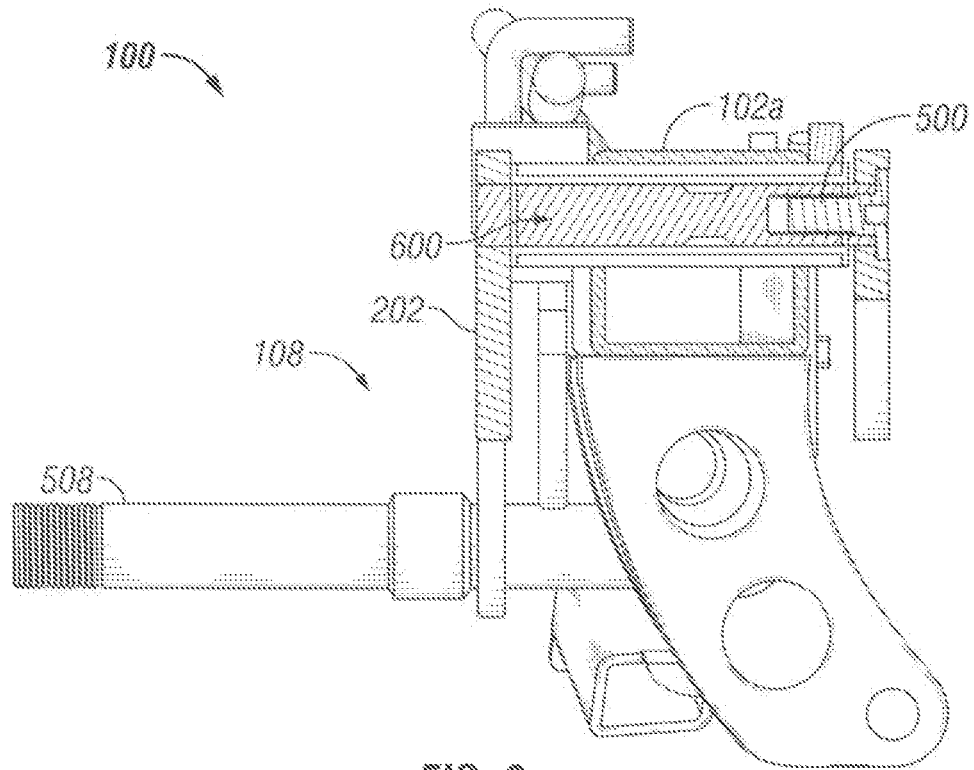
FIG. 6 illustrates a sectioned view of the self-lubricating SLZ-type tow dolly assembly shown in FIG. 5, in accordance with an embodiment of the present invention.
Figure 7:
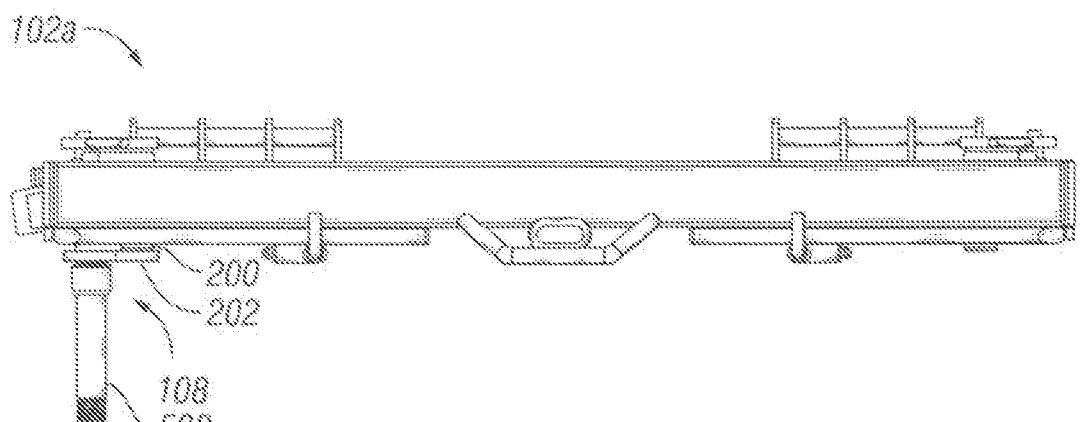
FIG. 7 illustrates a top view of the support tube, showing the spindle assemblies at the termini, in accordance with an embodiment of the present invention.

Conversely, as FIGS. 5 and 6 reference, the assembly 100, which utilizes the self-lubricating bearing sleeve 200 to lubricate the spindle bolt and bushing components of the spindle assembly 108. In one embodiment, the assembly 100 comprises a pair of elongated support tubes 102*a-b* disposed in a spaced-apart relationship (See FIG. 8). The support tubes 102*a-b* are defined by two or more boreholes near the termini. The support tubes 102*a-b* are configured to carry the spindle and bushing components.

Figure 8:
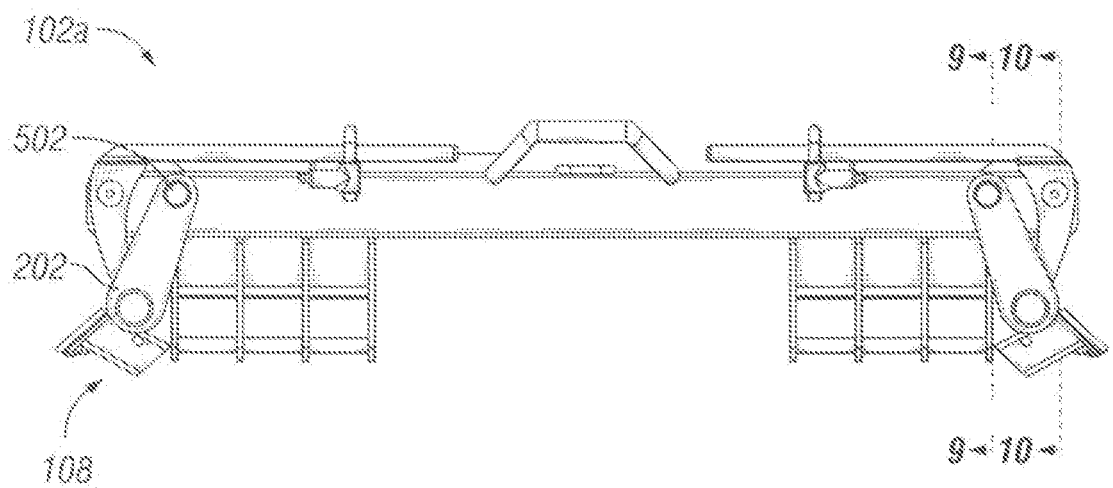
FIG. 8 illustrates a front view of the support tube, showing the spindle assemblies at the termini, in accordance with an embodiment of the present invention.
Figure 9:
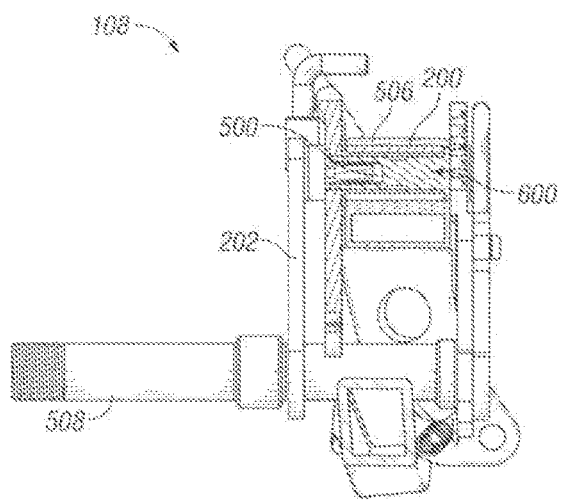
FIG. 9 illustrates a sectioned view of a trip subassembly, in accordance with an embodiment of the present invention.

In this manner, the boreholes serve as an anchor for the spindle subassembly 108, which pivotally holds the dolly wheels 106*a-d*. The elongated feature of the support tubes 102*a-b*, shown in FIG. 8, is rigid enough to support the weight of the axles 104*a-b* and the dolly wheels 106*a-d*, while also supporting the lubrication of the spindle bolt and bushing components for facilitated rotation of the spindle subassembly 108.

In some embodiments, the assembly 100 comprises a pair of axles 104*a-b* disposed in a spaced-apart relationship and extended perpendicularly between the support tubes 102*a-b*, as shown in FIG. 1. The axles 104*a-b* disposed at a distance operable to enable carrying the front wheels or rear wheels of a vehicle. In one embodiment, the axles 104*a* and 104*b* are length-adjustable, being telescopically extendable and retractable.

The axles 104*a-b* are spaced apart so as to cradle the front or rear wheels of a vehicle to be towed. The axles are supported by a pair of elongated support tubes, which rotatably carry wheels. In operation, the front wheels or rear wheels ride on the dolly while the front or rear wheels ride on the back of the tow truck. Because the vehicle is riding on the dollies and on the back of the tow truck, the drive train remains motionless.

Figure 2:
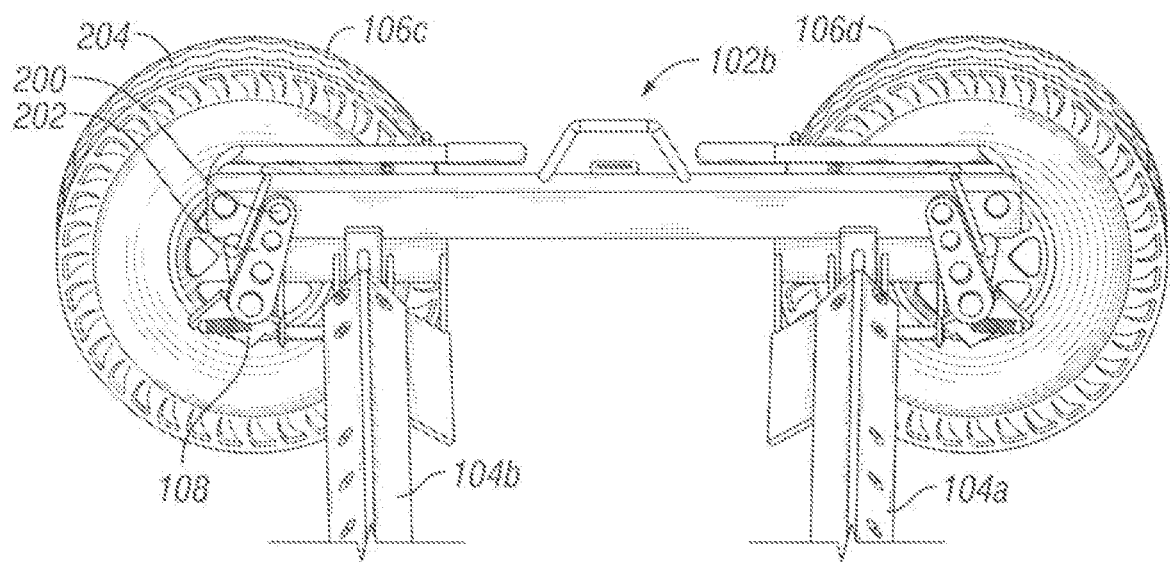
FIG. 2 illustrates an isometric rear view of an exemplary support tube and spindle subassembly of the self-lubricating SLZ-type tow dolly assembly shown in FIG. 1, in accordance with an embodiment of the present invention.

Looking again at FIG. 2, the assembly 100 comprises two or more dolly wheels 106*a-d* for mobility of the Assembly 100. The dolly wheels 106*a-d* are joined with the support tubes 102*a-b*. The dolly wheels 106*a-d* are in approximate alignment with the boreholes in the support tubes 102*a-b*. The dolly wheels 106*a-d* comprise one or more central hub holes and a perimeter tread 204.

Figure 10:
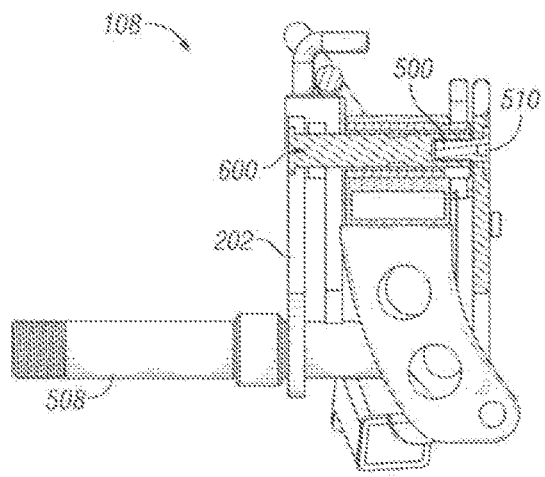
FIG. 10 illustrates sectioned view of a spindle subassembly, in accordance with an embodiment of the present invention.

Turning now to FIG. 5, the assembly 100 includes a spindle subassembly 108. The spindle subassembly 108 comprises a shaft 508 and front and rear brackets 202. The shaft 508 is sized to rotatably carry the dolly wheels 106*a-d*. In one non-limiting embodiment, the front and rear brackets 202 form one or more fastening holes 600, as shown in FIG. 10. The spindle subassembly 108 serves as a pivotal *nexus* between the support tubes 102*a-b* and the dolly wheels 106*a-d*. The spindle bolt 500 requires lubricant to pivot inside bushing 506 in accommodation to the spindle subassembly 108.

In some embodiments, the assembly 100 provides a spindle bolt 500 that is defined by a closed end 502 and an open end 504. The spindle bolt 500 helps hold the components together, while also providing a rotatable axle for retaining the spindle subassembly 108. In one non-limiting embodiment, the spindle bolt 500 is configured to pivotally fasten the spindle subassembly 108 to the support tubes 102*a-b*. The spindle bolt 500 passes through the spindle bushing 506, the boreholes of the support tubes 102*a-b*, and the fastening holes 600 of the front and rear brackets 202 for the spindle subassembly 108.

As illustrated in FIG. 5, the self-lubricating bearing sleeve 200 is disposed to concentrically house the spindle bolt 500. This is a snug fit in the spindle bushing 506 that the spindle bolt 500 can still rotate inside the self-lubricating bearing sleeve 200 with minimal friction. Rotational and linear motion creates pressure that discharges incremental amounts of the lubricant. In this manner, the lubricant is integral in the self-lubricating bearing sleeve 200. In some embodiments, the self-lubricating bearing sleeve 200 is operable to facilitate rotational motion against the spindle bolt 500 with the lubricant.

In some embodiments, the self-lubricating Igus M250 bearing sleeve is a press-fit bearing into the spindle bushing 506. The inner diameter adjusts only after press-fit in the proper housing bore of the spindle bushing 506 with a recommended tolerance. The before press-fit oversized dimension can be up to 2% of the inner diameter. In this manner, the secure press-fitting of the bearing is achieved. Axial or radial shifts in the housing are also prevented.

The primary characteristics of the self-lubricating 200 sleeve is that it is self-lubricating and maintenance-free; provides efficient vibration damping; resistant to edge loads; provides high impact resistance; and is thick walled, according to DIN 1850. In one non-limiting embodiment, the self-lubricating bearing sleeve 200 is a plastic component with a lubricant integral therein. This allows for self-lubricating of spindle bolt 500 during rotation of spindle subassembly 108. In another embodiment, the self-lubricating bearing sleeve 200 is a self-lubricating Igus M250 bearing sleeve. An exemplary self-lubricating Igus M250 bearing sleeve is cited in US20160266162A1.

The self-lubricating Igus M250 bearing sleeve distinguishes itself through its impact strength, vibration dampening, and wear resistance. The bearing sleeve 200 excels in applications in which vibration dampening is necessary, for example, in fitness and packaging machines. Advantages provided by the self-lubricating Igus M250 bearing sleeve may include, without limitation: self-lubricating and maintenance-free; efficient vibration damping; resistant to edge loads; high impact resistance; thick walled according to DIN 1850.

Looking again at FIG. 5, the assembly 100 also provides a spindle bushing 506 that concentrically houses the self-lubricating bearing sleeve 200. The bearing sleeve 200 is configured to dampen vibrations between the spindle bolt 500 and the spindle bushing 506. In this manner, the lubricant from the self-lubricating bearing sleeve 200 helps lubricate the spindle bolt 500. Additionally, a spindle screw 510 is fastenable to the open end 504 of the spindle bolt 500. The spindle screw 510 fastens the spindle bolt 500 in the spindle bushing 506 through the boreholes in the support tubes 102a-b.

Figure 11:
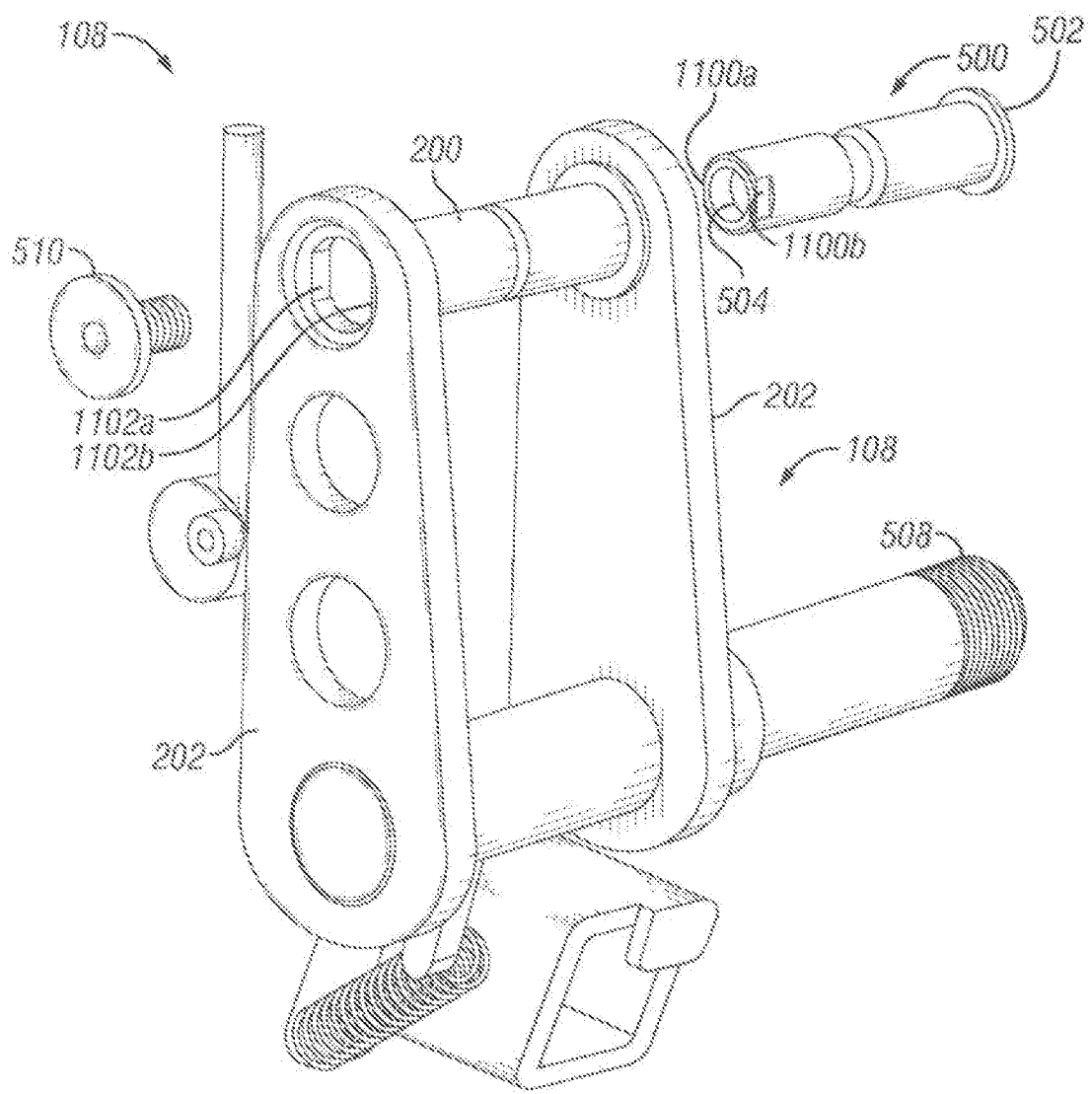
FIG. 11 illustrates rear isometric view of a spindle subassembly for a self-lubricating SLZ-type tow dolly assembly, in accordance with an embodiment of the present invention.

FIG. 11 illustrates a rear isometric view of a spindle subassembly 108 for an SLZ tow dolly. The spindle subassembly 108 is a unique configuration that works to synchronize rotational motion, and thereby create a uniform and facilitated rotational motion against a spindle bolt 500. As discussed above, the spindle bolt 500 helps hold the components together, while also providing a rotatable axis for retaining the spindle subassembly 108. In some embodiments, the spindle subassembly 108 may include a spindle bolt 500 that is defined by an open end 504 and a closed end 502. The open end 504 of the spindle bolt 500, is machined in a Double-D configuration to form two flat sides 1100a, 1100b that mate to the two flat sides 1102a, 1102b of the Double-D hole in the rear spindle subassembly bracket 202.

Consequently, this allows the rear spindle subassembly bracket 202 to control and concentrically regulate the independent rotation of spindle bolt 500. Furthermore, the two flat mated surfaces 1100a-b, 1102a-b prevent the spindle bolt 500 from rotating independently within the Double-D hole of the rear spindle assemble bracket 202. This helps synchronize the rotational motion of spindle bolt 500 to the rear spindle assemble bracket 202.

Figure 12:
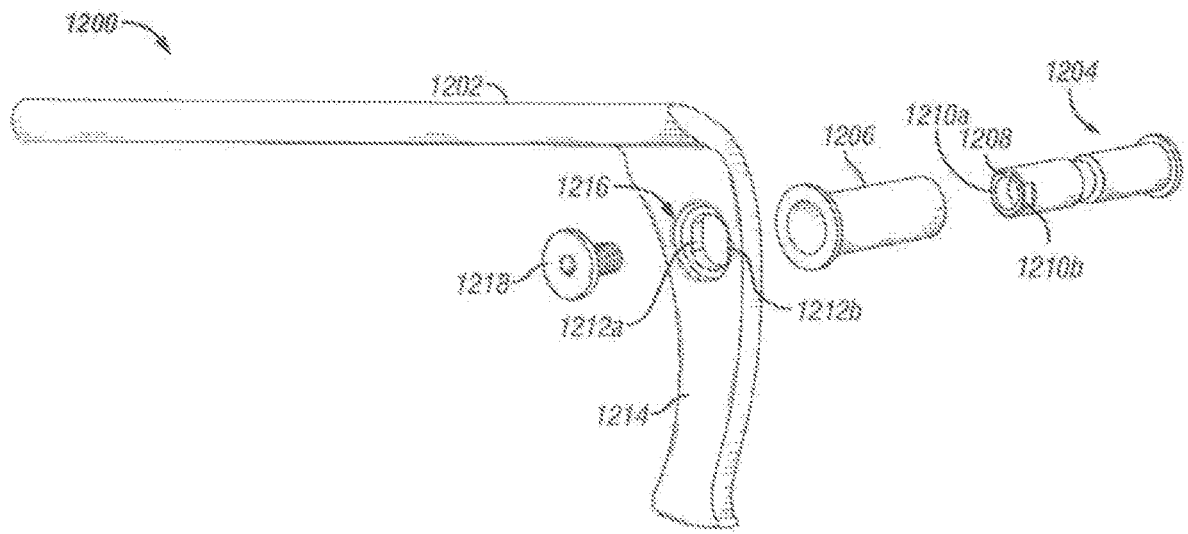
FIG. 12 illustrates front isometric view of a trip subassembly for a self-lubricating SLZ-type tow dolly assembly, in accordance with an embodiment of the present invention.

In other embodiments, of the SLZ tow dolly, a trip subassembly 1200 is utilized. The trip subassembly 1200 configuration is effective for resisting high pressure edge loads on the bearing sleeves. One example of a trip subassembly could include a high impact resistance. For example, FIG. 12 shows a front isometric view of an exemplary trip subassembly 1200, used with an SLZ-type tow dolly assembly. The components of the trip subassembly 1200 are arranged, so as to regulate rotational motion in the self-lubricating bearing sleeve.

As illustrated in FIG. 12, the trip subassembly 1200 provides a manual trip handle 1202 that rotates the trip bolt 1204 inside a self-lubricating bearing sleeve 1206. The self-lubricating bearing sleeve is disposed concentrically in a trip bolt. This creates a snug fit relationship in the trip bushing 1216, such that the trip bolt 1204 rotates inside the self-lubricating bearing sleeve 1206 with minimal friction. In this manner, by pulling up on a trip handle 1202, the trip bolt 1204 rotates inside self-lubricating bearing sleeve 1206.

The self-lubricating bearing sleeve 1206 is press fit into trip bushing 1216 which is fixed in support tubes 102a-b by a spindle screw 1218. Similar to self-lubricating spindle subassembly bearing sleeve 200, the trip subassembly bearing sleeve 1206 is operatively disposed inside trip bushing 1216. Furthermore, the open end 1208 of trip bolt 1204 is machined in a Double-D configuration to form two flat sides 1210a, 1210b that mate to the two flat sides 1212a, 1212b of the Double-D hole in trip body 1214. In this manner, the trip body 1214 captures the independent rotation of trip bolt 1204. The two flat mated surfaces 1210a-b, 1212a-b prevent trip bolt 1204 from rotating independently within the trip body 1214 Double-D hole, thereby synchronizing their rotation the one to the other.

Figure 13:
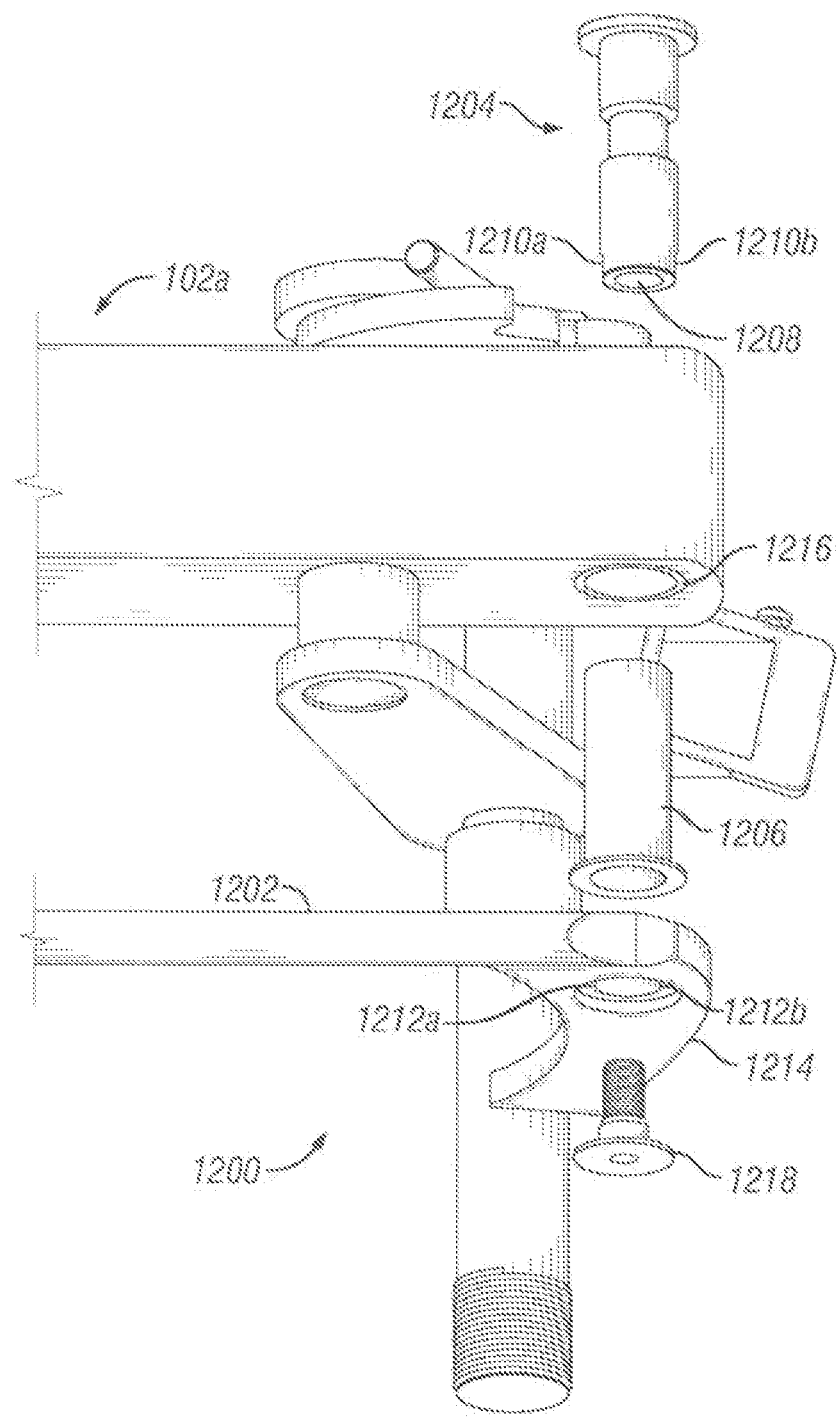
FIG. 13 illustrates top isometric view of a trip subassembly for a self-lubricating SLZ-type tow dolly assembly, in accordance with an embodiment of the present invention.

Turning now to FIG. 13, a top isometric view of the trip subassembly 1200 from FIG. 12 is shown. As illustrated from this operational view, the spindle subassembly 108 utilizes the self-lubricating bearing sleeve 1206; the trip subassembly 1200 also utilizes a self-lubricating bearing sleeve 1206 for the same purpose of dampening vibration between trip bolt 1204 and trip bushing 1216. The trip subassembly 1200 also utilizes a self-lubricating bearing sleeve 1206 to help reduce manufacturing costs.

This is possible because the need to manually lubricate a trip bolt 1204 in a tow dolly is eliminated. The bearing sleeve 1206 also eliminates seized components from corrosion. Finally, the bearing sleeve 1206 reduces maintenance. The trip subassembly 1200 will provide greaseless bearing sleeves that create a better fit in the trip bushing 1216. It is resistant to edge loads and is configured for high impact resistance.

In conclusion, the self-lubricating SLZ-type tow dolly assembly 100 provides a self-lubricating bearing sleeve that is operable in an SLZ-type tow dolly. This serves to negate the need for grease fittings and manually greasing of the spindle bushing. The self-lubricating bearing sleeve press fit into a spindle bushing disposed in a spindle assembly to lubricate the spindle bolt. This facilitates rotational motion against the spindle bolt.

Continuing, the self-lubricating bearing sleeve is a self-lubricating Igus M250 bearing sleeve that press fits into dolly pivot bushings. Rotational and linear motion creates pressure that discharges incremental amounts of the lubricant. Thus, self-lubricating bearing sleeve serves as a self-lubricating, pivot-point bearing sleeve. The self-lubricating bearing sleeve may be a plastic component with a lubricant integral therein. This allows for self-lubricating of bushing and spindle components during rotation of spindle assembly.

In alternative embodiments, a trip assembly and a spindle assembly operate in the self-lubricating bearing sleeve These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A self-lubricating SLZ-type tow dolly assembly, the assembly comprising:
    a pair of axles disposed in a spaced-apart relationship;
    a pair of elongated support tubes joined with the axles in a substantially orthogonal relationship;
    a spindle subassembly comprising a shaft and two brackets, the shaft being operable to enable rotational motion, the brackets being defined by one or more fastening holes;
    a spindle bolt defined by a closed end and an open end, the spindle bolt pivotally fastening at least one of the brackets of the spindle subassembly to the support tubes;
    a self-lubricating bearing sleeve housing the spindle bolt, the self-lubricating bearing sleeve and the spindle bolt being in a rotational relationship, the self-lubricating bearing sleeve comprising a lubricant, the self-lubricating bearing sleeve operable to incrementally discharge the lubricant upon rotational motion,
    whereby the lubricant is integral to the self-lubricating bearing sleeve,
    whereby the lubricant facilitates rotational motion between the self-lubricating bearing sleeve and the spindle bolt; and
    a spindle bushing housing the self-lubricating bearing sleeve, the spindle bushing operable to dampen vibrations between the spindle bolt and the spindle bushing.

2. The assembly of claim 1, wherein the support tubes are disposed in a spaced-apart relationship.

3. The assembly of claim 1, further comprising two or more dolly wheels joined with the support tubes.

4. The assembly of claim 3, wherein the dolly wheels comprise one or more central hub holes and a perimeter tread.

5. The assembly of claim 4, wherein the shaft of the spindle subassembly is operable to rotatably carry the dolly wheels.

6. The assembly of claim 1, wherein, the axles are at a distance operable to enable carrying the front wheels or rear wheels of a vehicle.

7. The assembly of claim 1, further comprising a spindle screw fastenable to the open end of the spindle bolt, the spindle screw operable to fasten the spindle bolt into the support tubes.

8. The assembly of claim 1, wherein the spindle bolt is defined by a closed end and an open end, or a closed end and a threaded end.

9. The assembly of claim 8, further comprising a spindle nut fastenable to the threaded end of the spindle bolt, the spindle nut operable to fasten the spindle bolt in the support tubes.

10. The assembly of claim 1, wherein the spindle bolt passes through the spindle bushing through the support tubes and the fastening holes of the bracket.

11. The assembly of claim 1, wherein the lubricant facilitates movement by the spindle bushing.

12. The assembly of claim 1, wherein the self-lubricating bearing sleeve is a self-lubricating Igus M250 bearing sleeve.

13. The assembly of claim 1, wherein the open end of the spindle bolt is machined in a Double-D configuration to form two flat sides that mate with two flat sides of the Double-D hole in the spindle subassembly bracket.

14. The assembly of claim 1, wherein the brackets of the spindle subassembly comprise a front bracket and a rear bracket.

15. The assembly of claim 1, wherein the self-lubricating bearing sleeve concentrically houses the spindle bolt.

16. The assembly of claim 1, further comprising trip subassembly operatively connected to the self-lubricating bearing sleeve.

17. A self-lubricating SLZ-type tow dolly assembly, the assembly comprising:
    a pair of axles disposed in a spaced-apart relationship;
    a pair of elongated support tubes disposed in a spaced-apart relationship, the support tubes joined with the axles in a substantially orthogonal relationship;
    two or more dolly wheels joined with the support tubes;
    a spindle subassembly comprising a shaft and two brackets, the shaft being operable to enable rotational motion, the brackets being defined by one or more fastening holes;
    a spindle bolt defined by a closed end and an open end, or a closed end and a threaded end, the spindle bolt pivotally fastening at least one of the brackets of the spindle subassembly to the support tubes;
    a spindle screw fastenable to the open end of the spindle bolt, the spindle screw operable to fasten the spindle bolt into the support tubes;
    a self-lubricating bearing sleeve concentrically housing the spindle bolt, the self-lubricating bearing sleeve and the spindle bolt being in a rotational relationship, the self-lubricating bearing sleeve comprising a lubricant, the self-lubricating bearing sleeve operable to incrementally discharge the lubricant upon rotational motion,
    whereby the lubricant is integral to the self-lubricating bearing sleeve,
    whereby the lubricant facilitates rotational motion between the self-lubricating bearing sleeve and the spindle bolt;
    a spindle subassembly operatively connected to the self-lubricating bearing sleeve; and
    a spindle bushing concentrically housing the self-lubricating bearing sleeve, the spindle bushing operable to dampen vibrations between the spindle bolt and the spindle bushing.

18. The assembly of claim 17, wherein the self-lubricating bearing sleeve is a self-lubricating Igus M250 bearing sleeve.

19. The assembly of claim 17, further comprising a spindle nut fastenable to the threaded end of the spindle bolt, the spindle nut operable to fasten the spindle bolt in the support tubes.

20. A self-lubricating SLZ-type tow dolly assembly, the assembly comprising:
    a pair of axles disposed in a spaced-apart relationship;

a pair of elongated support tubes disposed in a spaced-apart relationship, the support tubes joined with the axles in a substantially orthogonal relationship;

two or more dolly wheels joined with the support tubes in a rotatable relationship, the dolly wheels being disposed in approximate alignment with the support tubes;

a spindle subassembly comprising a shaft and two brackets, the shaft being operable to enable rotational motion of the dolly wheels, the brackets being defined by one or more fastening holes;

a spindle bolt defined by a closed end and an open end, or a closed end and a threaded end, the spindle bolt pivotally fastening at least one of the brackets of the spindle subassembly to the support tubes;

a spindle screw fastenable to the open end of the spindle bolt, the spindle screw operable to fasten the spindle bolt into the support tubes;

a self-lubricating Igus M250 bearing sleeve concentrically housing the spindle bolt, the self-lubricating Igus M250 bearing sleeve and the spindle bolt being in a rotational relationship, the self-lubricating Igus M250 bearing sleeve comprising a lubricant, the self-lubricating Igus M250 bearing sleeve operable to incrementally discharge the lubricant upon rotational motion, whereby the lubricant is integral to the self-lubricating Igus M250 bearing sleeve, whereby the lubricant facilitates rotational motion between the self-lubricating Igus M250 bearing sleeve and the spindle bolt;

a spindle subassembly operatively connected to the self-lubricating Igus M250 bearing sleeve; and a spindle bushing concentrically housing the self-lubricating Igus M250 bearing sleeve, the spindle bushing operable to dampen vibrations between the spindle bolt and the spindle bushing.

\* \* \* \* \*